(12) United States Patent
Schilder et al.

(10) Patent No.: US 12,352,340 B2
(45) Date of Patent: Jul. 8, 2025

(54) ELECTRIC DRIVE DEVICE FOR A MOTOR VEHICLE, IN PARTICULAR FOR A MOTOR CAR, AND MOTOR VEHICLE

(71) Applicant: MERCEDES-BENZ GROUP AG, Stuttgart (DE)

(72) Inventors: Tobias Schilder, Ludwigsburg (DE); Philip Gansloser, Bad Ditzenbach (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/698,895

(22) PCT Filed: Sep. 9, 2022

(86) PCT No.: PCT/EP2022/075061
§ 371 (c)(1),
(2) Date: Apr. 5, 2024

(87) PCT Pub. No.: WO2023/057167
PCT Pub. Date: Apr. 13, 2023

(65) Prior Publication Data
US 2024/0401680 A1   Dec. 5, 2024

(30) Foreign Application Priority Data

Oct. 7, 2021   (DE) .................... 10 2021 005 016.9

(51) Int. Cl.
*F16H 37/08*   (2006.01)
*B60K 1/00*   (2006.01)
*B60K 17/08*   (2006.01)

(52) U.S. Cl.
CPC ............ *F16H 37/082* (2013.01); *B60K 1/00* (2013.01); *B60K 17/08* (2013.01);
(Continued)

(58) Field of Classification Search
CPC .......... F16H 37/082; F16H 2200/0021; F16H 2200/2007; B60K 1/00; B60K 17/08; B60K 2001/001
See application file for complete search history.

(56) References Cited

U.S. PATENT DOCUMENTS 10,309,507 B2   6/2019 Scharr et al.
10,781,921 B2*  9/2020 Tanaka ................ F16H 63/3425
(Continued)

FOREIGN PATENT DOCUMENTS

CN   203713556 U    7/2014
DE   102013225519 A1  6/2015
(Continued)

OTHER PUBLICATIONS

Definition of interlock and conjoint (Year: 2018).*
Machine translation of DE 102017007088 A1 (Year: 2019).*
Machine translation of WO 2019162039 A1 (Year: 2019).*
(Continued)

*Primary Examiner* — Farhana Pervin
(74) *Attorney, Agent, or Firm* — PATENT PORTFOLIO BUILDERS PLLC

(57) ABSTRACT

An electric drive device for a motor vehicle includes a housing, an electric engine having a rotor, a planetary transmission at least partially arranged in the housing, a first planetary gear set having a first sun gear connected to the rotor for conjoint rotation, a first planetary carrier, and a first annular gear, and a second planetary gear set having a second planetary carrier connected to the first planetary carrier for conjoint rotation and a second annular gear; at least two switch elements for switching at least two gears, and a differential having a differential input shaft and two output drive shafts. The second planetary gear set has a second sun gear which is connected to the differential input shaft for conjoint rotation.

20 Claims, 2 Drawing Sheets

Figure 1:
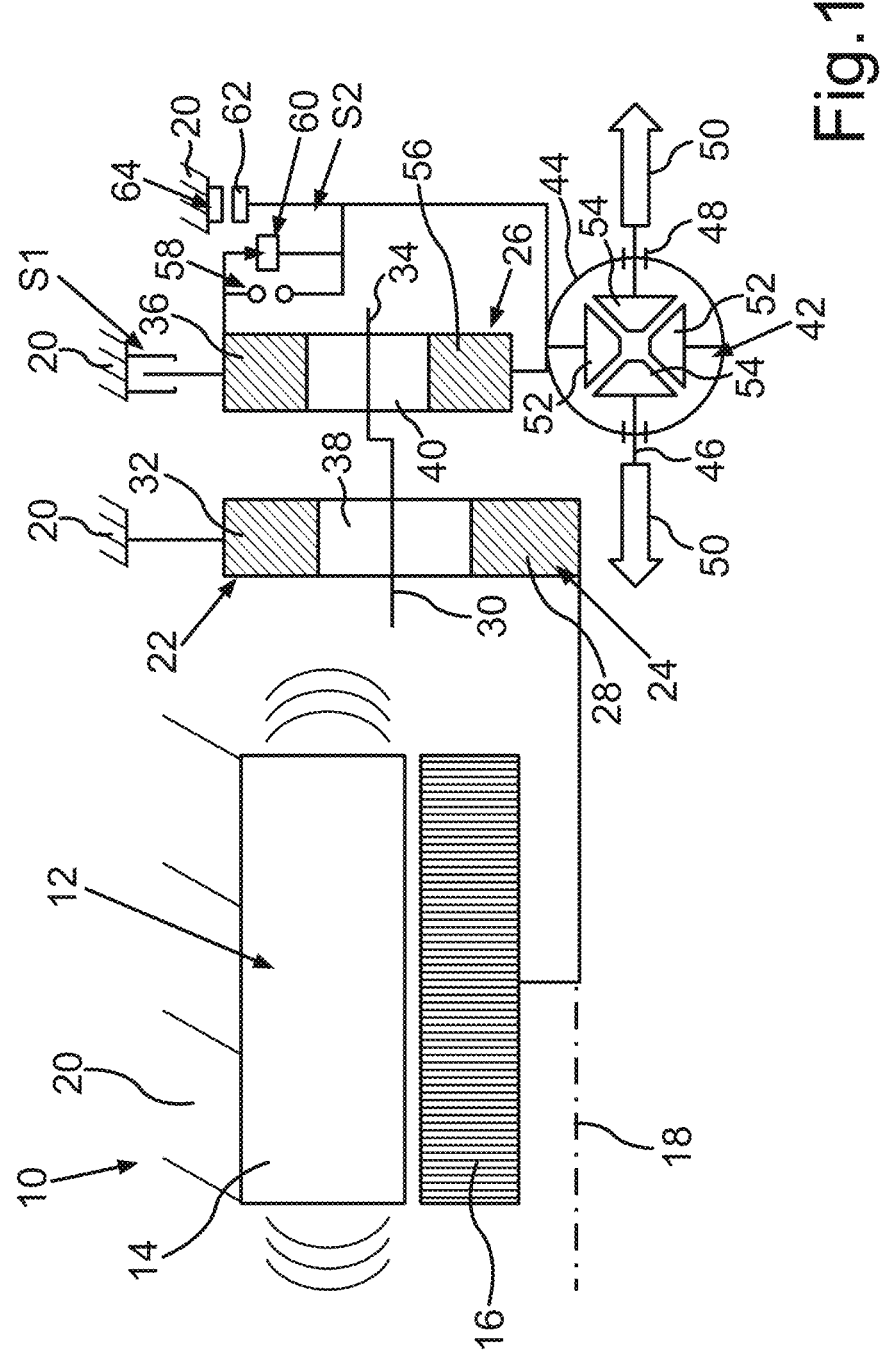

(52) U.S. Cl.
CPC .......... *B60K 2001/001* (2013.01); *F16H 2200/0021* (2013.01); *F16H 2200/2007* (2013.01)

(56) References Cited

U.S. PATENT DOCUMENTS

| | | | |
|---|---|---|---|
| 2013/0005526 A1* | 1/2013 | Matsubara | B60K 1/00 475/290 |
| 2017/0219064 A1* | 8/2017 | Mordukhovich | B60K 17/08 |
| 2018/0119779 A1* | 5/2018 | Knoblauch | B60K 1/00 |
| 2019/0210589 A1* | 7/2019 | Tanaka | B60W 10/182 |
| 2021/0394602 A1* | 12/2021 | Schilder | F16H 3/66 |
| 2022/0266686 A1* | 8/2022 | Voelkel | F16H 37/082 |

FOREIGN PATENT DOCUMENTS

| | | | | |
|---|---|---|---|---|
| DE | 102017007088 A1 | | 1/2019 | |
| DE | 102017011387 A1 | | 6/2019 | |
| WO | 2016055322 A1 | | 4/2016 | |
| WO | WO-2019162039 A1 | * | 8/2019 | ............ B60K 1/00 |

OTHER PUBLICATIONS

Belz; "Varianten von Mehrgang-Planetengetrieben;" Mar. 8, 2016; https://register.epo.org/application?documentId=EYPWMGE67270DSU&appnumber=EP13756488&showPdfPage=all.

International Search Report and Written Opinion mailed Dec. 16, 2022 in related/corresponding International Application No. PCT/EP2022/075061.

Office Action created May 5, 2022 in related/corresponding DE Application No. 10 2021 005 016.9.

\* cited by examiner

ELECTRIC DRIVE DEVICE FOR A MOTOR VEHICLE, IN PARTICULAR FOR A MOTOR CAR, AND MOTOR VEHICLE

BACKGROUND AND SUMMARY OF THE INVENTION

Exemplary embodiments of the invention relate to an electric drive device for a motor vehicle, as well as to a motor vehicle, in particular a motor car.

DE 10 2013 225 519 A1 discloses a planetary transmission for a motor vehicle, having an input shaft forming a sun gear, a planetary carrier carrying a first set of planetary gears and a second set of planetary gears, a first annular gear assigned to the first set of planetary gears, and a second annular gear assigned to the second set of planetary gears. A first locking means is also provided, by means of which the first annular gear can be locked. A second locking means is further provided, by means of which the second annular gear can be locked.

CN 2 03 713 556 U also presents the features specified above, and additionally that a second planetary gear set has a second sun gear, which is connected to a differential input shaft for conjoint rotation.

Exemplary embodiments of the present invention are directed to an electric drive device for a motor vehicle, and a motor vehicle, such that a particularly low-loss and compact structure can be implemented.

A first aspect of the invention relates to an electric drive device for a motor vehicle, in particular for a motor car preferably designed as a passenger car. This means that in its fully produced state, the motor vehicle preferably designed as a motor car, in particular as a passenger car, has the electric drive device, and can be driven electrically, in particular purely electrically, by means of the electric drive device. For this purpose, the electric drive device comprises a housing and at least one electric engine, by means of which the motor vehicle can be driven electrically, in particular purely electrically. The electric engine has a rotor. For example, the electric engine also has a stator, by means of which the rotor can be driven, and thus can be rotated around an engine axis of rotation relative to the stator. In particular, the electric engine can provide drive torques via its rotor for driving the motor vehicle. For example, by means of the electric engine, in particular by means of the rotor, at least or exactly two vehicle wheels, also simply described as wheels, of an axle of the motor vehicle can be driven, whereby the motor vehicle can be driven.

The electric drive device additionally comprises a planetary transmission, which is at least partially, in particular at least substantially, and thus at least more than half or completely arranged in the housing. The planetary transmission has a first planetary gear set and a second planetary gear set. The first planetary gear set comprises a first sun gear, which is connected, in particular permanently, to the rotor for conjoint rotation. In addition, the first planetary gear set comprises a first planetary carrier, also described as a first link, and a first annular gear.

The first sun gear, the first planetary carrier and the first annular gear are first transmission elements of the first planetary gear set. The second planetary gear set comprises a second planetary carrier, which is connected, in particular permanently, to the first planetary carrier for conjoint rotation. In addition, the second planetary gear set comprises a second annular gear. The second planetary carrier and the second annular gear are second transmission elements of the second planetary gear set. In particular, if the respective transmission element is not connected to the housing for conjoint rotation and is driven, in particular by the respective drive torque or a respective torque resulting from the respective drive torque being applied to the respective transmission element, the respective transmission element can be rotated, in particular around a transmission element axis of rotation, relative to the housing. In particular, it is conceivable that the first transmission elements are arranged coaxially with one another. As an alternative or in addition, the second transmission elements are for example arranged coaxially with one another. The planetary gear sets are preferably arranged coaxially with one another. As an alternative, it is conceivable that the planetary gear sets are arranged axially offset from one another.

The electric drive device additionally has a first switch element and a second switch element. The switch elements are designed to switch at least two gears of the electric drive device, in particular of the planetary transmission.

In the context of the present disclosure, a connection for conjoint rotation of two rotatable or rotatably mounted elements is understood to mean that these two elements are arranged coaxially with each other and are connected to each other such that they rotate at the same angular velocity, in particular around an element axis of rotation and/or relative to the housing, in particular if one of the elements, and thus the element, is driven. In particular, the respective element can be the respective transmission element. In particular, the element axis of rotation can be the transmission element axis of rotation. Preferably, the rotor is arranged coaxially with at least one of the planetary gear sets, in particular with both planetary gear sets, also described as planetary sets, such that, for example, the engine axis of rotation coincides with the transmission element axis of rotation.

The feature that elements are permanently connected or coupled to one another for conjoint rotation should be understood to mean that, rather than providing a switch element that can be switched between a coupled state, which connects or couples the elements with each other for conjoint rotation, and a decoupled state, in which the elements are decoupled from one another and can be rotated relative to one another such that no torques can be transmitted between the elements, instead the elements are continuously or always, and thus permanently, connected or coupled with one another for conjoint rotation.

The electric drive device additionally comprises a differential, which is, for example, assigned to the previously specified axle, and thus, for example, to the vehicle wheels, which can be driven via the rotor by means of the electric engine. In particular, the vehicle wheels can be driven by the rotor via the differential. As is already sufficiently known, the differential, for example, has such a function that the differential permits different rotational speeds of the vehicle wheels when the motor vehicle is driving around a bend such that the wheel on the outside of the bend rotates at a greater rotational speed than the wheel on the inside of the bend, in particular while the vehicle wheels can be or are driven via the differential by the rotor, and thus by the electric engine.

The differential has a differential input shaft, via which the respective drive torque or a respective torque resulting from the respective drive torque can be introduced into the differential, whereby the differential, and via the latter, wheels, can be driven. The differential further comprises two output drive shafts, which can be driven by the differential input shaft. In particular, the vehicle wheels can be driven by the output drive shafts, in particular such that a first of the wheels can be driven by a first of the output drive shafts, and the second wheel can be driven by the second output drive shaft. The rotor is preferably, in particular also, arranged coaxially with the output drive shafts.

To be able to implement a particularly low-loss and compact structure of the electric drive device, it is provided in a known manner that the second planetary gear set has a second sun gear, which is a further second transmission element of the second planetary gear set. In addition, the second sun gear is, in particular permanently, connected to the differential input shaft for conjoint rotation.

For example, if it is not connected to the housing for conjoint rotation, the respective first transmission element can be rotated around a first transmission element axis of rotation relative to the housing, wherein the first transmission element axis of rotation is also described as a first planetary gear set axis of rotation. It is conceivable that, in particular, if it is not connected to the housing for conjoint rotation, the respective second transmission element can be rotated around a second transmission element axis of rotation relative to the housing, wherein the second transmission element axis of rotation is also described as a second planetary gear set axis of rotation. Because, preferably, the planetary gear sets are arranged coaxially with one another, the planetary gear set axes of rotation or the transmission element axes of rotation coincide. If the planetary gear sets are arranged axially offset from each other, then the transmission element axes of rotation run in parallel with one another, and are preferably spaced apart from one another.

According to the invention, the second switch element is designed to block the second planetary gear set.

The second switch element is thus a blocking switch element, by means of which the second planetary gear set can be blocked. For this purpose, the second switch element is designed to connect two of the transmission elements of the second planetary gear set to each other for conjoint rotation. Thus, for example, the second switch element can be switched or adjusted between a second coupled state and a second decoupled state. In the second coupled state, two elements of the second planetary gear set, which are not already permanently connected to each other for conjoint rotation, are connected to each other for conjoint rotation by means of the second switch element, whereby the second planetary gear set as a whole is blocked. In the second decoupled state, the second switch element releases the elements to rotate relative to one another around the transmission element axis of rotation, whereby the second planetary gear set is unblocked.

To be able to implement a particularly advantageous drivability in a compact and low-loss manner, it is provided in an embodiment of the invention that the first switch element is designed to connect the second annular gear to the housing for conjoint rotation. This should in particular be understood to mean that the first switch element can be switched between a first coupled stated and a first decoupled state. In the first coupled state, the second annular gear can be connected to the housing by means of the first switch element, and is thus fixed to the housing for conjoint rotation. In particular, the second annular gear thus also cannot rotate around the transmission element axis of rotation relative to the housing if the second annular gear is driven. In the first decoupled state, the first switch element releases the second annular gear to rotate relative to the housing around the transmission element axis of rotation, such that the second annular gear can be or is rotated around the transmission element axis of rotation relative to the housing in particular if the second annular gear is driven.

For example, the first switch element can be moved, in particular relative to the housing and/or translationally, between at least one first coupled position causing the first coupled state and at least one first decoupled position causing the first decoupled state. It is further conceivable that the second switch element can be moved, in particular translationally and/or relative to the housing, between at least one second coupled position causing the second coupled state and at least one second decoupled position causing the second decoupled state.

At least one of the switch elements, in particular the second switch element, can, for example, be designed as a form-fit switch element, e.g., a claw coupling, or have a form-fit switch element, e.g., a claw coupling. It is further conceivable that at least one of the switch elements, e.g., the first switch element, is designed as a force- or friction-fit switch element, or has such a force- or friction-fit switch element, by means of which, for example, one of the transmission elements can be connected to a further transmission element or to the housing in a force- or form-fit, torque-transmitting manner, in particular for conjoint rotation. The friction-fit switch element is also described as a friction-fit coupling, and can, for example, be designed as a disc coupling. The form-fit switch element is also described as a form-fit coupling, and can, for example, be designed as a claw coupling. The form-fit switch element is, in particular, designed to connect two of the transmission elements or one of the transmission elements and the housing to each other for conjoint rotation via at least one form-fit connection, which is, for example, formed by at least two solid bodies mutually overlapping in at least one or both directions of rotation running around the transmission element axis of rotation. By contrast, the friction-fit switch element can connect two of the transmission elements or one of the transmission elements and the housing to each other for conjoint rotation, in particular exclusively, by friction or friction forces, for example by at least two friction partners being connected to each other in a torque-transmitting manner, in particular for conjoint rotation, for example without the friction partners mutually overlapping around the transmission element axis of rotation.

So that losses can be kept particularly low, it is provided in a further embodiment of the invention that the second switch element has a form-fit switch element, in particular a claw coupling. By means of the claw coupling, two of the transmission elements or one of the transmission elements and the housing can, for example, be connected to each other in a form-fit manner for conjoint rotation in at least or exactly one or in both directions of rotation running around the transmission element axis of rotation.

To be able to implement a particularly advantageous drivability in a particularly installation space-, weight-, and cost-efficient manner, it is provided in a further embodiment of the invention that the second switch element has a freewheel coupling arranged or switched in parallel with the claw coupling, and also simply described as a freewheel. By means of the freewheel coupling, two of the transmission elements or one of the transmission elements and the housing are or can be connected to each other for conjoint rotation in a first direction of rotation running around the transmission element axis of rotation, wherein or while the freewheel coupling permits relative rotations between the transmission elements or between the transmission element and the housing in a second direction of rotation running around the transmission element axis of rotation opposite to the first direction of rotation. Preferably, the freewheel coupling is form-fit or acts in a form-fit manner, whereby losses can be kept particularly low.

To be able to implement a particularly advantageous drivability and therefore, in particular, a particularly advantageous multi-gear capability in a particularly compact and low-loss manner, it is provided in a further embodiment of the invention that the second switch element is designed to connect the second sun gear to the second annular gear for conjoint rotation. Thus, the second planetary gear set can be blocked in a particularly advantageous manner with regard to a construction and arrangement of the second switch element.

A further embodiment is characterized in that the electric drive device has a park gear, which is connected, in particular permanently, to the second sun gear for conjoint rotation. The park gear is, for example, a component of a parking lock, which can be activated and deactivated. If the parking lock is activated, then the park gear, and via the latter the second sun gear, is prevented from rotating relative to the housing around the transmission element axis of rotation, whereby, for example, it can be or is avoided that the motor vehicle undesirably rolls away, in particular if the motor vehicle is parked on an incline. If the parking lock is deactivated, the park gear, and thus the second sun gear can rotate, in particular around the transmission element axis of rotation and relative to the housing, such that, for example, the motor vehicle can roll down an incline. This makes it possible to achieve a particularly advantageous drivability of the motor vehicle in a particularly low-loss and space-saving manner.

So that costs and weight can be kept particularly low, it is provided in a further embodiment of the invention that the first annular gear is permanently connected to the housing for conjoint rotation.

Lastly, it has proved particularly advantageous if the second planetary gear set is arranged axially overlapping the differential. A length of the drive device running in the axial direction of the planetary transmission can thus, in particular, be kept particularly low. The feature that the second planetary gear set is arranged axially overlapping the differential should, in particular, be understood to mean that the second planetary gear set is overlapped or covered at least partially, in particular at least substantially, and thus more than half or completely, in the radial direction of the second planetary gear set, and thus outwards along a direction running perpendicular to the transmission element axis of rotation, and thus in particular when viewed from the second sun gear to the second annular gear, in particular with regard to an extension or length of the second planetary gear set running in the axial direction of the planetary transmission.

A second aspect of the invention relates to a motor vehicle preferably designed as a motor car, in particular as a passenger car, which has at least or exactly one electric drive device according to the invention, and can be driven electrically, in particular purely electrically, by means of the drive device. Advantages and advantageous embodiments of the first aspect of the invention should be seen as advantages and advantageous embodiments of the second aspect of the invention and vice versa.

In particular, the following advantages can be implemented by the invention:
- loss-optimized and compact structure
- at least one of the switch elements can be designed as a form-fit switch element, e.g., as a claw brake or claw coupling, or have such a form-fit switch element, and optionally the specified freewheel, whereby losses can be kept particularly low. In a conversion to a freewheel, the latter for example lies on a well-suited, inner diameter.
- relative speeds of rotation in open-running switch elements can be kept particularly low.
- the switch elements can be very easily accessible.
- loads on the switch elements can be kept particularly low.
- good gearing efficacy, in particular in the first gear
- rotational speeds of the electric engine can be kept particularly low at high speeds, in particular due to the multi-gear capability of the planetary transmission.

A friction-fit or force-fit switch element, e.g., the first switch element, in particular has the advantage that it can at least substantially achieve powershifting capability, sometimes with a certain reduction in pulling force, but without interrupting pulling force, in particular when switching from one of the gears into the second gear and/or vice versa.

In particular with regard to kinematic equivalence, which should presently be viewed as comprised and disclosed with the above, it can be provided that in a planetary gear set, a single planetary carrier can be replaced by a double planetary carrier, in particular if links of the two other transmission elements of this planetary gear set are simultaneously exchanged. In a planetary gear set, a switch element in particular designed as a brake switch element, in particular for fixed connection to the housing, can for example be replaced by a permanent fixed connection to the housing, in particular if a switch element is simultaneously installed in a fixed connection of the two other transmission elements of this planetary gear set, i.e., for example, if a fixed connection of the two other transmission elements of this planetary gear set is simultaneously replaced by a switch element.

Advantageously, the differential is designed as a bevel gear differential, in particular having a differential cage, wherein the differential cage can be connected to the differential input shaft, in particular permanently, for conjoint rotation, or wherein the differential cage can form the differential input shaft.

Further advantages, features and details of the invention result from the following description of preferred exemplary embodiments and with reference to the drawing. The features and combinations of features previously specified in the description and the features and combinations of features specified in the following description of figures and/or shown only in the figures can be used not only in the specified combination, but also in other combinations or in isolation without leaving the scope of the invention.

BRIEF DESCRIPTION OF THE DRAWING FIGURES

Figure 2:
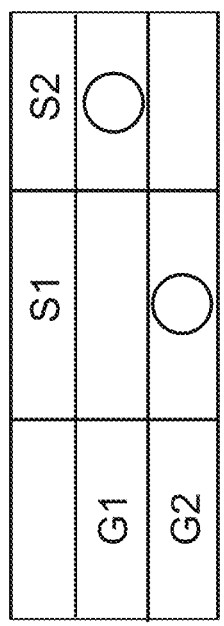

In the drawing:

FIG. 1 shows a schematic depiction of an electric drive device for a motor vehicle; and FIG. 2 shows a gear shift table for depicting switchable, i.e., engageable and disengageable gears of the electric drive device.

In the figures, identical or functionally identical elements are provided with identical reference numerals.

DETAILED DESCRIPTION

FIG. 1 shows, in a schematic depiction, an electric drive device 10 for a motor vehicle. The motor vehicle, in particular designed as a motor car, and most particularly as a passenger car, preferably has at least or exactly two axles arranged one behind the other in the longitudinal direction of the vehicle, which are also described as vehicle axles. The respective axle has at least or exactly two wheels, also described as vehicle wheels, which are ground contact elements of the motor vehicle. The respective wheels of the respective axle are arranged on opposite sides of the motor vehicle in the transverse direction of the vehicle. The motor vehicle is or can be supported downwards in the vertical direction of the vehicle on a road via the wheels designed as a ground contact element of the motor vehicle. If the motor vehicle is driven electrically, in particular purely electrically, by means of the drive device 10 while the motor vehicle is supported downwards in the vertical direction of the vehicle on the road, then the wheels roll along the road. For example, with regard to the axles, the drive device 10 is assigned exclusively, and thus to exactly one of the axles, such that, for example, with regard to the wheels, only the wheels of the axle to which the drive device 10 is assigned can be driven by means of the drive device 10.

The drive device 10 has an electric engine 12, which has a stator 14 and a rotor 16. The rotor 16 can be driven by means of the stator 14, and can thus be rotated around an engine axis of rotation 18 relative to the stator 14, and also relative to a housing 20 of the drive device 10. Via the rotor 16, the electric engine 12 can provide a drive torque to drive the wheels of the axle to which the electric engine 12 or the drive device 10 is assigned. The wheels, which can be driven by means of the electric engine 12 via its rotor 16, are also described as drive wheels. The drive device 10 also has the housing 20 depicted particularly schematically in FIG. 1, to which, for example, the stator 14 is fixed in a manner fixed against rotation. The drive device 10 has a planetary transmission 22, which comprises a first planetary gear set 24 and a second planetary gear set 26. Preferably, the planetary gear sets 24 and 26 are respectively at least partially, in particular at least substantially, and thus at least more than half or completely, arranged in the housing 20, such that the planetary transmission 22 is at least partially arranged in the housing 20. In addition, the rotor 16 is, for example, arranged coaxially with the planetary gear sets 24 and 26. The planetary gear set 24 has a first sun gear 28, a first planetary carrier 30, and a first annular gear 32, wherein the first planetary carrier 30 is described as a first link. The sun gear 28, the first planetary carrier 30, and annular gear 32 are also described as first transmission elements. In particular, if the respective first transmission element is not connected to the housing 20 for conjoint rotation, the respective first transmission element can be rotated around a first transmission element axis of rotation relative to the housing 20.

The second planetary gear set 26 has a second planetary carrier 34 and a second annular gear 36. The second planetary carrier 34 is also described as a second link. The second planetary carrier 34 and the second annular gear 36 are second transmission elements of the second planetary gear set 26. In particular, if the respective second transmission element is not connected to the housing 20 for conjoint rotation, the respective second transmission element can be rotated around a second transmission element axis of rotation relative to the housing 20. Because, in the exemplary embodiment shown in FIG. 1, the planetary gear sets 24 and 26 are arranged coaxially with each other, the transmission element axes of rotation coincide, and because the rotor 16 is arranged coaxially with the planetary gear sets 24 and 26, the transmission element axes of rotation coincide with the engine axis of rotation 18.

The first planetary gear set 24 additionally has at least one or several first planetary gears 38. The respective first planetary gear 38 is rotatably mounted on the first planetary carrier 30, and for example respectively interlocks directly with the first sun gear 28 and the annular gear 32. The planetary gear set 26 additionally has at least one or several second planetary gears 40. The respective second planetary gear 40 is rotatably mounted on the second planetary carrier 34, and interlocks with the annular gear 36, in particular directly. The drive device 10, in particular the planetary transmission 26, has a first switch element S1. The drive device 10, in particular the planetary transmission 22, further has a second switch element S2. By means of the switch elements S1 and S2, at least or exactly two gears of the drive device 10, in particular of the planetary transmission 22, can be switched. The switch elements S1 and S2 are thus designed to switch at least or exactly two gears of the drive device 10, in particular of the planetary transmission 22. This means that the two gears can be engaged and disengaged by means of the switch elements S1 and S2. A first of the gears is also described as a first gear 1, and a second of the gears is also described as a second gear 2. In particular, the gears differ from one another with regard to their transmission ratios, in particular such that the transmission ratio of the first gear 1 is greater than the transmission ratio of the second gear 2.

The drive device 10 additionally has a differential 42, which can, for example, be designed as a bevel gear differential. The differential 42 has a differential input shaft 44, via which the respective drive torque or a respective torque resulting from the respective drive torque can be introduced into the differential 42. The differential input shaft, also simply described as an input shaft 44, and thus the differential 42 are thus driven. The differential 42 further comprises two output drive shafts 46 and 48, which can be driven by the input shaft. The output drive shafts 46 and 48 can thus provide a respective torque depicted in FIG. 1 by arrows 50, by means of which the wheels of the axle to which the drive device 10 is assigned can be driven. For example, the differential 42 comprises differential gears 52, which interlock with output drive gears 54 of the differential 42. The output drive gears 54 are gearwheels, which are connected, in particular permanently, to the output drive shafts 46 and 48 for conjoint rotation. The differential gears 52 are also gearwheels. The rotor 16 is preferably arranged coaxially with the output drive shafts 46 and 48 that are arranged coaxially with one another. This should, in particular, be understood to mean that the output drive shafts 46 and 48 can be rotated around a shared output drive shaft axis of rotation relative to the housing 20, wherein the engine axis of rotation 18 and the output drive shaft axis of rotation coincide. From FIG. 1 it can additionally be seen that the first sun gear 28 is connected, in particular permanently, to the rotor 16 for conjoint rotation. In addition, the second planetary carrier 34 is connected, in particular permanently, to the first planetary carrier 30 for conjoint rotation.

To be able to implement a particularly low-loss and compact structure of the drive device 10, the second planetary gear set 26 has a second sun gear 56, which is a further second transmission element of the second planetary gear set 26. In addition, the second sun gear 56 is, in particular permanently, connected to the differential input shaft 44 for conjoint rotation.

The first switch element S1 is designed to connect the second annular gear 36 to the housing for conjoint rotation. In the exemplary embodiment shown in FIG. 1, the switch element S1 is a friction-fit or force-fit switch element, in particular a disc coupling, wherein it is in particular conceivable that the switch element S1 is free of a form-fit switch element. It is thus conceivable that the switch element S1 is designed to connect the annular gear 36 to the housing 20 for conjoint rotation exclusively via friction-fit or force-fit.

The second switch element S2 is preferably designed to block the planetary transmission 22. In the exemplary embodiment shown in FIG. 1, the second switch element S2 is designed to connect the second annular gear 36 to the second sun gear 56, and thus to the differential input shaft 44, for conjoint rotation. It is essential, however, that the second switch element S2 is designed to connect two of the three transmission elements of the second planetary gear set 26 to each other for conjoint rotation. The three transmission elements of the second planetary gear set 26 are: second sun gear 56, second planetary carrier 34, second annular gear 36.

In the exemplary embodiment shown in FIG. 1, the second switch element S2 has a form-fit switch element in the form of a claw coupling 58, by means of which the planetary transmission 22 can, in particular, be blocked in at least or exactly one or both of the axes of rotation running around the transmission element axis of rotation, in particular such that by means of the claw coupling 58, the annular gear 36 can be connected in a form-fit manner, for conjoint rotation, to the differential input shaft 44, and in particular via the latter to the sun gear 56 around at least or exactly one or both of the axes of rotation running around the transmission element axis of rotation. The switch element S2 according to FIG. 1 further has a freewheel coupling 60 also simply described as a freewheel, which is arranged or switched in parallel with the claw coupling 58. By means of the freewheel (freewheel coupling 60), the annular gear 36 can be or is coupled with the differential input shaft 44 and the sun gear 56 in a first direction of rotation running around the transmission element axis of rotation, in particular in a form-fit manner, in particular while the freewheel permits relative rotations between the annular gear 35 and the sun gear 56 or the differential input shaft 44 in a second direction of rotation running around the transmission element axis of rotation and opposite to the first direction of rotation.

The drive device 10 additionally has a park gear 62 of a parking lock 64, wherein the park gear 62 is connected, in particular permanently, to the differential input shaft 44, and thus to the sun gear 56, for conjoint rotation. The differential input shaft 44 and the sun gear 56, and in particular, via the differential input shaft 44, the output drive shafts 46 and 48, and thus the output drive gears if the parking lock 64 is activated, whereby the park gear 62 is, in particular, connected to the housing 20 in a form-fit manner for conjoint rotation, are thus secured against a rotation implemented relative to the housing 20, i.e., are prevented from rotating in such a way, whereby the motor vehicle is in particular secured against rolling away undesirably if the motor vehicle is stopped, and in particular parked, on an incline. In addition, the first annular gear 32 is permanently connected to the housing 20 for conjoint rotation. The planetary gear set 26 is further arranged axially overlapping the differential 42, whereby the planetary gear set 26 is at least partially overlapped or covered by the differential 42 in the radial direction of the planetary gear set 26, and thus along a direction running outwards perpendicular to the transmission element axis of rotation, and thus when viewed from the sun gear 56 to the annular gear 36.

In the exemplary embodiment shown in FIG. 1, the switch element S2 follows the two planetary gear sets 24 and 26 in the axial direction of the planetary transmission 22. In an embodiment not shown in the figures, the second switch element S2 is arranged in an axial direction of the planetary transmission 22 between the planetary gear sets 24 and 26. It is further conceivable that the second annular gear 36 can be connected to the planetary carrier 30 for conjoint rotation, and thus to the planetary carrier 34 by means of the switch element S2. It is further conceivable that the switch element S2 is designed as a friction-fit switch element, and is in particular free of a form-fit switch element, such that for example, the planetary transmission 22 can be blocked in particular purely in a friction-fit or force-fit manner by means of the switch element S2. It is further conceivable that, in particular proceeding from the exemplary embodiment shown in FIG. 1, the freewheel (freewheel coupling 60) is not required, such that, for example, the switch element S2 only has the claw coupling 58, and is thus free of a freewheel. For all of the embodiments, it is conceivable that the switch element S2 is arranged between the planetary gear sets 24 and 26 in the axial direction of the planetary transmission 22. In a further embodiment, not shown in the Figures, it is possible that the differential input shaft 44, and thus the second sun gear 56, can be connected to the annular gear 36 for conjoint rotation by means of the switch element S2, wherein the switch element S2 preferably only has the claw coupling 58, and follows the two planetary gear sets 24 and 26 in the axial direction of the planetary transmission 22.

In a further embodiment, not shown in the figures, it is conceivable that the switch element S2 only has the freewheel (freewheel coupling 60). In particular, in this regard, the freewheel can follow in the axial direction of the planetary transmission 22 on both planetary gear sets 24 and 26. This embodiment has the advantage that only the freewheel is used, and the claw coupling 58 is not required, such that no switch element to be controlled hydraulically or electromechanically must be provided. However, compromises could be made during recuperation, because the freewheel would be open when coasting, and thus during recuperation. An advantage of the respective embodiments, in which the switch element S2 has the claw coupling 58 and the freewheel or only the freewheel, is, in particular, that when changing gears, for example from the first gear 1 to the second gear 2, wherein the second switch element, which is also labelled K, is a so-called going coupling, and the switch element S1, which is also labelled B, is a so-called coming coupling, the claw coupling of the switch element K can first be opened if claw couplings are present, wherein the switch element K is then still closed via the freewheel (freewheel coupling 60), and as soon as a torque is transmitted to the switch element B, in particular a brake moment is transmitted to the switch element B, the switch element K is freed of load, and the freewheel of the switch element K opens automatically, so to speak, at the right point in time. In relation to a pure claw coupling, this is advantageous, because a claw coupling cannot, or at least cannot particularly comfortably be opened under load.

It is further conceivable that the switch element S1 is designed as a form-fit switch element, in particular as a claw coupling, and is in particular free of a friction-fit switch element.

FIG. 2 shows a gear shift table, in which the first gear is labelled G1, the second gear is labelled G2. To engage the first gear G1, the first switch element S1 is opened, and the second switch element S2 is closed. To engage the gear G2, the first switch element S1 is closed, and the second switch element S2 is opened. For example, a first transmission ratio of the first gear G1 lies in a range of 5 to 6 inclusive, in particular in a range of 5 to 5.5 inclusive. For example, a second transmission ratio of the second gear G2 lies in a range of 2 to 3 inclusive, in particular in a range of 2 to 2.5 inclusive. For example, a gear spread lies in a range of 2 to 3 inclusive, in particular in a range of 2 to 2.5 inclusive. For example, a first gearing efficacy in the first gear G1 is at least 98%, and a second gearing efficacy in the second gear G2 is for example at least 97%.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE NUMERALS 10 electric drive device
12 electric engine
14 stator
16 rotor
18 engine axis of rotation
20 housing
22 planetary transmission
24 first planetary gear set
26 second planetary gear set
28 first sun gear
30 first planetary carrier
32 first annular gear
34 second planetary carrier
36 second annular gear
38 first planetary gear
40 second planetary gear
42 differential
44 differential input shaft
46 output drive shaft
48 output drive shaft
50 arrow
52 differential gear
54 output drive gear
56 second sun gear
58 claw coupling
60 freewheel clutch
62 park gear
64 parking lock
G1 first gear
G2 second gear
S1 first switch element
S2 second switch element

The invention claimed is:

1. An electric drive device for a motor vehicle, the electric drive device comprising:
a housing;
an electric engine having a rotor and configured to drive the motor vehicle;
a planetary transmission, at least partially arranged in the housing, comprising
a first single planetary gear set comprising a first sun gear connected to the rotor for conjoint rotation, a first single planetary carrier, and a first annular gear, and
a second single planetary gear set comprising a second single planetary carrier connected to the first single planetary carrier for conjoint rotation, and a second annular gear;
at least two switch elements, which includes a first switch element and a second switch element, configured to switch at least two gears; and
a differential having a differential input shaft and two output drive shafts,
wherein the second single planetary gear set has a second sun gear connected to the differential input shaft for conjoint rotation, and
wherein the second switch element is configured to connect two of three transmission elements of the second single planetary gear set.

2. The electric drive device of claim 1, wherein the first switch element is configured to connect the second annular gear to the housing for conjoint rotation.

3. The electric drive device of claim 1, wherein the second switch element has a claw coupling.

4. The electric drive device of claim 3, wherein the second switch element has a freewheel coupling arranged in parallel with the claw coupling.

5. The electric drive device of claim 1, wherein the two of the three transmission elements of the second single planetary gear set include the second sun gear and the second annular gear, and the second switch element is configured to connect the second sun gear to the second annular gear for conjoint rotation.

6. The electric drive device of claim 1, further comprising:
a park gear connected to the second sun gear for conjoint rotation.

7. The electric drive device of claim 1, wherein the first annular gear is permanently connected to the housing for conjoint rotation.

8. The electric drive device of claim 1, wherein the second single planetary gear set is arranged axially overlapping the differential.

9. A motor vehicle, comprising:
a first and second wheel; and
an electric drive device comprising
a housing;
an electric engine having a rotor and configured to drive the motor vehicle;
a planetary transmission, at least partially arranged in the housing, comprising
a first single planetary gear set comprising a first sun gear connected to the rotor for conjoint rotation, a first single planetary carrier, and a first annular gear, and
a second single planetary gear set comprising a second single planetary carrier connected to the first single planetary carrier for conjoint rotation, and a second annular gear;
at least two switch elements, which includes a first switch element and a second switch element, configured to switch at least two gears;
a differential having a differential input shaft and two output drive shafts, wherein the each of the two output drive shafts are respectively coupled to one of the first and second wheels, wherein the second single planetary gear set has a second sun gear connected to the differential input shaft for conjoint rotation, and wherein the second switch element is configured to connect two of three transmission elements of the second single planetary gear set.

10. An electric drive device for a motor vehicle, the electric drive device comprising:

a housing;

an electric engine having a rotor and configured to drive the motor vehicle;

a planetary transmission, at least partially arranged in the housing, comprising
 a first planetary gear set comprising a first sun gear connected to the rotor for conjoint rotation, a first planetary carrier, and a first annular gear, and
 a second planetary gear set comprising a second planetary carrier connected to the first planetary carrier for conjoint rotation, a second sun gear, and a second annular gear, wherein first planetary gears are rotatably mounted on the first planetary carrier, and respectively interlock directly with the first sun gear and the first annular gear, wherein second planetary gears are rotatably mounted on the second planetary carrier and respectively interlock directly with the second sun gear and the second annular gear;

at least two switch elements, which includes a first switch element and a second switch element, configured to switch at least two gears; and a differential having a differential input shaft and two output drive shafts, wherein the second sun gear is connected to the differential input shaft for conjoint rotation, and wherein the second switch element is configured to connect two of three transmission elements of the second single planetary gear set.

11. The motor vehicle of claim 9, wherein the first switch element is configured to connect the second annular gear to the housing for conjoint rotation.

12. The motor vehicle of claim 9, wherein the second switch element has a claw coupling and a freewheel coupling arranged in parallel with the claw coupling.

13. The motor vehicle of claim 9, wherein the two of the three transmission elements of the second single planetary gear set include the second sun gear and the second annular gear, and the second switch element is configured to connect the second sun gear to the second annular gear for conjoint rotation.

14. The motor vehicle of claim 9, wherein the first annular gear is permanently connected to the housing for conjoint rotation.

15. The motor vehicle of claim 9, wherein the second single planetary gear set is arranged axially overlapping the differential.

16. The electric drive device of claim 10, wherein the first switch element is configured to connect the second annular gear to the housing for conjoint rotation.

17. The electric drive device of claim 10, wherein the second switch element has a claw coupling and a freewheel coupling arranged in parallel with the claw coupling.

18. The electric drive device of claim 10, wherein the two of the three transmission elements of the second single planetary gear set include the second sun gear and the second annular gear, and the second switch element is configured to connect the second sun gear to the second annular gear for conjoint rotation.

19. The electric drive device of claim 10, wherein the first annular gear is permanently connected to the housing for conjoint rotation.

20. The electric drive device of claim 10, wherein the second single planetary gear set is arranged axially overlapping the differential.

* * * * *